United States Patent [19]

Jamet

[11] Patent Number: 4,954,306
[45] Date of Patent: Sep. 4, 1990

[54] METHOD AND DEVICE FOR THE MANUFACTURE OF A SHEET OF POLYVINYLBUTYRAL

[75] Inventor: Bernard Jamet, Compiegne, France

[73] Assignee: Saint-Gobain Vitrage, Courbevoie, France

[21] Appl. No.: 262,783

[22] Filed: Oct. 26, 1988

[30] Foreign Application Priority Data

Oct. 26, 1987 [FR] France .................................. 87 14764

[51] Int. Cl.$^5$ ............................................. B29C 47/88
[52] U.S. Cl. .................................. 264/210.2; 26/106; 264/342 RE; 425/135; 425/367
[58] Field of Search ................ 26/86, 106; 264/210.2, 264/40.7, 210.7, 342 RE, 345; 425/334, 367, 363, 135

[56] References Cited

U.S. PATENT DOCUMENTS

| | | | |
|---|---|---|---|
| 2,947,060 | 8/1960 | Umstott | 26/106 |
| 3,038,206 | 6/1962 | Eccles | 26/106 |
| 3,255,567 | 7/1966 | Keslar et al. | 156/104 |
| 3,868,286 | 2/1975 | Fariss et al. | 264/342 RE |
| 4,093,695 | 6/1978 | Heirbaut | 264/342 RE |
| 4,425,406 | 1/1984 | Palma | 156/106 |

FOREIGN PATENT DOCUMENTS

| | | |
|---|---|---|
| 185863 | 7/1986 | European Pat. Off. . |
| 191130 | 8/1986 | European Pat. Off. . |
| 3408613 | 9/1985 | Fed. Rep. of Germany . |

OTHER PUBLICATIONS

French Search Report FR 8714764 (FA 402109) dated July 15, 1988.

*Primary Examiner*—Jill L. Heitbrink
*Attorney, Agent, or Firm*—Oblon, Spivak, McClelland, Maier & Neustadt

[57] ABSTRACT

Sheet of polyvinyl butyral is extruded, it is subjected to a humidifying and relaxation treatment by maintaining it stretched between rollers, the sheet of polyvinylbutyral is passed through a cold zone, in particular around cooling drums, so as to fix it, the sheet is rolled under a given tension, and prior to fixing the sheet in the cold zone, the sheet is allowed to form at least one free loop.

13 Claims, 1 Drawing Sheet

U.S. Patent
Sep. 4, 1990
4,954,306
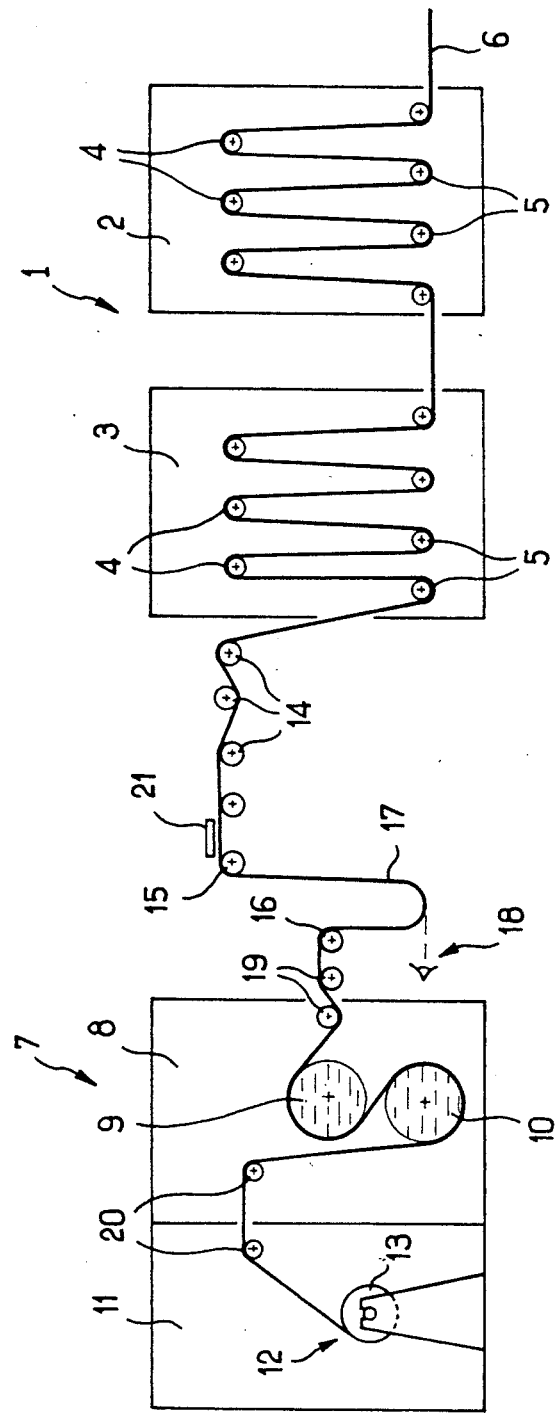

METHOD AND DEVICE FOR THE MANUFACTURE OF A SHEET OF POLYVINYLBUTYRAL

BACKGROUND OF THE INVENTION

1. Field of the Invention:

The invention relates to the manufacture of a sheet of polyvinylbutyral intended to be used as an intermediate layer in laminated glazings.

2. Background of the Prior Art:

Sheets of polyvinylbutyral are manufactured continuously, generally using an extrusion drawplate, to form a ribbon which is rolled at the end of the manufacturing line so as to facilitate its stocking and transport to the use location for the manufacture of the laminated glazings. At this location, the ribbon is cut into rough shapes for assembly with the other constituent components of the laminated glazings.

At the time of stacking the components, the sheet of intermediate plastic material is therefore in the form of a generally trapezoidal rough shape, the size of which is slightly larger than that of the glazing. After the stacking and before the final assembly, which generally uses calendering by passage of the stack between press rollers and an autoclave cycle, the parts of the intermediate sheet which extend beyond the glazing are cut by trimming with a blade which is supported by the edge of the glazing. The glazing then undergoes its autoclave cycle.

This type of assembly requires the intermediate layer to have dimensional stability. However, in certain glazings shrinkage of this intermediate layer has been noted, particularly during the calendering, which is essentially due to the existence of stresses imparted to the layer during manufacturing, particularly traction stresses due to the method of manufacturing the polyvinylbutyral sheet, which continue to exist after stocking and unrolling the ribbon. The shrinkage of the intermediate sheet results in an absence of material along the edges of the glazing, particularly in the corners, which can permit the entry of the mastic used for glue mounting the glazing in the bay, and/or a weakening of the adhesion of the laminate components with one another. Finally, the shrinkage of the sheet can cause the glazing to be rejected.

To overcome this problem of shrinkage of the sheet during assembly with the other constituent components of the glazings, the PVB sheet has been submitted to a relaxation cycle between the unrolling of the sheet after stocking and its use as an intermediate in the manufacture of the laminated glazings. This cycle corresponds to the sheet in rough shape form remaining up to several days in an adapted location, at a normal temperature, that is, up to approximately 20° C. This solution is economically unsatisfactory. In addition, it does not solve another common problem, that of the adhesion of the sheet to itself in the heart of the roll during stocking Although fixed before rolling at a temperature of approximately 10° C. or less and kept stocked at that temperature, the sheet is subject to shrinkage during stocking, such that the successive layers adhere to one another, particularly in the heart of the roll. It is then necessary to exert considerable traction forces on the sheet in order to unroll it. There then occurs a stretching of the sheet., creating additional stresses, and finally even greater shrinkage when the stresses are released. In certain cases the adhesion is such that unrolling is impossible.

In European patent application Ser. No. 0 021 667, in order to reduce the shrinkage of the PVB sheet, it has already been proposed to exert a constant tension, between 35 and 173 grams per linear centimeter, on the polyvinylbutyral sheet, then to roll the sheet while maintaining this same tension, and to stock the roll at a temperature below 15° C. before its use. By this method, a reduction is achieved in the shrinkage of the polyvinylbutyral sheet in the assembly during the manufacture of the laminated glazing. However, this method is not fully satisfactory, especially in the case of the manufacture of a polyvinylbutyral ribbon of a very resilient nature. Shrinkage continues to exist with the above indicated disadvantages.

SUMMARY OF THE INVENTION

The invention proposes a new method for manufacturing a polyvinylbutyral sheet intended for use in laminated glazings, which promotes the shrinkage of the sheet prior to rolling, such that the shrinkage upon assembly becomes negligible and overcomes the other indicated disadvantages.

The method in accordance with the invention comprises the following sequential operations:
- a mixture of polyvinylbutyral and plasticizer are extruded to form the PVB sheet,
- the sheet is submitted to a humidifying and relaxation treatment by maintaining it stretched between rollers,
- the PVB sheet is passed through a cold zone where the sheet is fixed, in particular by passage around cooling drums,
- the sheet is rolled under a given tension to make it into a roll which can be stocked and transported, and in accordance with the invention, after the humidifying and relaxation treatment of the sheet stretched between the rollers and prior to its fixing by passage through the cold zone, the PVB sheet is allowed to form at least one free loop during its movement, that is, a loop in which the sheet is subjected only to its own weight.

The free loop allows the sheet to relax totally since it is then subjected only to the sole effect of its own weight and no longer to tensions between rollers.

This invention also includes a device for carrying out this process.

BRIEF DESCRIPTION OF THE DRAWING

The FIGURE is a schematic diagram of the apparatus employed in this invention.

DETAILED DESCRIPTION OF THE INVENTION

In practicing the process of this invention, the length of the free loop can vary depending on the type of polyvinylbutyral sheet manufactured, that is, depending on the nature of the starting components, PVB resin and plasticizer. Generally, however, for a given type of PVB and for a given sheet thickness and width, the length of the loop is a substantially constant value, generally between 40 centimeters and 2 meters. In fact, this length depends on the forward speed of the sheet, with these two parameters being linked to the length of time of the additional relaxation provided by the free loop which corresponds to the length of time for one point of the sheet to pass through said loop. Therefore, in accordance with one aspect of the invention, the PVB sheet during its continuous movement is allowed to relax prior to being fixed under the sole effect of its own weight for a period of at least equal to approximately 5 seconds.

Another important parameter is the temperature of the PVB sheet in the free loop. In order to obtain maximum relaxation, the PVB sheet must be brought to a temperature of between 25° C. and 80° C. At a temperature below 25° C., no additional relaxation is noted, whereas at a temperature above 80° C., the sheet becomes too soft.

The temperature of the sheet is preferably between 45° C. and 55° C. at this time.

In addition to providing the sheet with the additional relaxation by its passage through a free loop, said free loop, due to its position before the fixing operation, enables the sheet to be fixed while it undergoes no traction force, other than the weight of the sheet itself, due to the difference in level of the low part of the loop in relation to the level of the means for recovering the sheet downstream. Thus, the fixing of the sheet is preferably carried out while the sheet is at a level close to the lowest level of the loop.

One of the advantages of the method in accordance with the invention is that the free loop, and in particular the measure of its height, is a simple means for controlling the regular forward movement of the sheet, which is necessary for the removal of stress-generating tensions. Thus, by measuring the lower level of the loop using a detector, the variations of said level can be detected and, consequently, the speeds of the sheet transporter rollers, in particular the rollers arranged downstream of the loop, can be modified as well as the speed of the cooling drums around which the fixing of the sheet is carried out.

In combination with the formation of a free loop before fixing the sheet, the relaxation of the polyvinylbutyral sheet can, as necessary, be further improved by providing other free loops arranged before the fixing of the sheet. In this manner, other loops can be provided just upstream of the first loop, and after the zone for humidifying and relaxation under tension between rollers.

In an alternative embodiment, one or several free loops can be provided between two parts of the zone for humidifying and relaxation under tension between rollers.

The method in accordance with the invention is advantageously used in the manufacture of a PVB sheet obtained by extrusion of a mixture of PVB resin with a plasticizer, wherein the PVB resin has a molecular weight of 30,000 to 600,000, a content of 0 to 10% by weight of residual ester groups, calculated as polyvinyl acetates, and a hydroxyl content on the order of 12 to 25% by weight expressed as polyvinyl alcohol. These resins are preferably prepared as described in French Patent Publication No. FR 2,401,941, and their content of residual ester groups is less than 5%. The plasticizer is preferably a mixed alkyl and alkylaryl adipate, such as benzyl and octyl adipate, benzyl and hexyl adipate, benzyl and butyl adipate, benzyl and decyl adipate, a dialkyl adipate such as di-n-hexyl adipate, a triethyleneglycol diheptanoate, or a mixture of said plasticizers.

The invention also relates to a device for the manufacture of a polyvinylbutyral sheet which enables the tension stresses to be removed prior to fixing the sheet and rolling it for stocking before use. This device is comprised of a manufacturing line comprising an extruder, a hot zone containing chambers with a humidified atmosphere provided with rollers around which the extruded sheet moves, an intermediate zone provided with at least two rollers between which the PVB sheet forms a free loop, a cold zone containing a compartment provided with cooling drums and a compartment for rolling where the sheet is rolled on a cylindrical drum in order to form a roll of PVB which can subsequently be stocked and transported to the sites for use in the manufacture of laminated glazings. The device is preferably equipped with a detector marking the position of the lower level of the loop.

FIG. 1 is a simplified representation of one part of the device in accordance with the invention.

This part of the device comprises a hot zone 1 formed by two humidifying and relaxation chambers 2, 3, provided with upper rollers 4 and lower rollers 5 between which the stretched polyvinylbutyral sheet 6 circulates, a cold zone 7 comprising a compartment provided with two cooling drums 9, 10, and a compartment for rolling the sheet provided with a rolling device 12 to form a roll 13. Between the second humidifying and relaxation chamber 3 and the cooling drums 9, 10, the device is provided with several rollers 14 for transporting the sheet 6 between the hot zone 1 and the cold zone 7. Two rollers 15 and 16 are sufficiently distant from one another to enable the formation of a free loop 17. The level of the downstream roller 16 is lower than the level of the upstream roller 15. This arrangement enables a long loop length, for example more than 1 meter, while minimizing the tension due to the weight of the loop before the sheet fixing operation. A detector 18 is provided under the downstream roller 16 to mark the lower level of the loop. This detector is linked to a system for regulating the speed of the rollers arranged downstream. Other rollers 19 carry the sheet between roller 16 and the cooling drum 9 and form a connection. Return rollers 20 take the sheet to the rolling device 12 to form roll 13.

The device can further comprise heating means in addition to those of a conventional manufacturing line, for example infrared resistance heaters 21, arranged upstream of the roller 15 supporting the free loop. The heating enables the temperature of the sheet to be brought to the desired value in order to obtain the optimal relaxation when the temperature of the sheet at the exit of the humidifying hot zone is insufficient.

Other characteristics and advantages of the invention will become apparent from the following examples:

EXAMPLE 1

A polyvinylbutyral sheet was manufactured from a PVB resin with a molecular weight of 30,000 to 600,000 having a content of 0 to 10% by weight of residual ester groups calculated as polyvinyl acetate and a hydroxyl content on the order of 12 to 25% by weight expressed as polyvinyl alcohol. This resin was obtained in accordance with the method described in French Patent Publication No. 2,401,941.

The plasticizer was mixed with the PVB resin in an amount of approximately 10 to 65% by weight of plasticized PVB. A mixed alkyl and alkylaryl adipate was able to be used as described in European Patent Publication No. 0 011 577. The PVB sheet extruded to a thickness of approximately 0.76 mm passed through a bath of cold water and exited therefrom to arrive at the first chamber 2 of the humid hot zone. In this chamber, as well as in the next one, the sheet acquired the desired amount of humidity while relaxing one part of the stresses due to the extrusion. Upon exiting the two chambers 2, 3 of the humid hot zone, the sheet which was at a temperature of approximately 45°-50° C., was taken by rollers 14 and submitted to heating by the infrared resistances 21, which brought it to a temperature of approximately 55° C., before forming a free loop 17 between the two rollers 15 and 16. The height h1 between the axis of roller 15 and the low level of the loop was approximately 80 cm, while the height h2 between the axis of roller 16 and said same low level was approximately 20 cm. The speed of the passage of the sheet in the free loop was approximately 10 meters per minute.

The sheet was then recovered by rollers 19 and passed around two cooling drums 9, 10, with each of the two surfaces of the sheet being in contact successively with the surface of one of the two drums. This sheet was thus cooled to a temperature below approximately 10° C. before being rolled at the rolling station to form a roll 13 which was able to be stocked, for example at a temperature below or equal to approximately 10° C., and transported.

The sheet prepared in this manner was used for the manufacture of laminated glazings. For this purpose, it was unrolled from the roll. This operation was carried out easily and no adhesion of the sheet to itself was observed, even at the heart of the roll. It was cut into rough shapes and placed between two sheets of glass. The overlapping parts of the sheet were cut by trimming. The glazing was calendered. No shrinkage of the PVB sheet was observed when it was placed between the sheets of glass, nor during calendering. The glazing then underwent an autoclave cycle under the usual temperature and pressure conditions, i.e., approximately 140° C. at approximately b 10 bars.

Upon exiting the autoclave, just as before, no shrinkage of the sheet nor peripheral detachment was noted.

REFERENCE EXAMPLE

The method of Example 1 was repeated, except the sheet was passed directly from one roller to another without allowing it to form the free loop between rollers 15 and 16.

The PVB sheet prepared in this manner was used in the same way as in Example 1 for the manufacture of laminated glazings. Firstly, adhesion of the sheet to itself was noted at the time of unrolling. As soon as the intermediate sheet was deposited on a sheet of glass, a shrinkage of the sheet was noted which increased during the calendering to reach several millimeters, in particular in the measurement corresponding to the direction of formation of the PVB ribbon and especially in the corners of the glazing.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A method for manufacturing a sheet of polyvinylbutyral to be used in laminated glazings, comprising extruding a sheet of polyvinylbutyral, subjecting said extruded sheet to a humid atmosphere at elevated temperature to relax said sheet by passing it through said atmosphere while stretching it between roller means, allowing the sheet to form a first free loop immediately before passing said sheet through cooling means, the cooling means fixing the properties of said sheet, and forming a roll of said sheet under tension on roller means.

2. The method in accordance with claim 1, wherein the length of time of passage of the sheet in the free loop is more than 5 seconds.

3. The method in accordance with claim 1, wherein the temperature of the sheet of polyvinylbutyral in the free loop is between 25 and 80° C.

4. The method in accordance with claim 3, wherein the temperature is between 45 and 55° C.

5. The method in accordance with claim 1, further comprising heating the sheet just before the formation of the free loop.

6. The method in accordance with claim 1, wherein the sheet forms additional free loops upstream of said first free loop.

7. The method in accordance with claim 1, wherein the cooling means comprises cooling drums and the speed of the cooling drums is regulated as a function of the position of the lowest level of the loop.

8. The method of claim 1, wherein said sheet is cooled so as to fix its properties immediately subsequent to formation of said free loop, said sheet undergoing no traction force between said free loop and said cooling means.

9. A device for forming a sheet of dimensionally stable polyvinylbutyral, comprising means for extruding said sheet, a hot zone containing compartments with a humidified atmosphere provided with rollers around which the sheet can move, an intermediate zone downstream of said hot zone provided with at least two rollers sufficiently separated from one another to enable the formation of a free loop of said sheet, a cold zone containing a compartment provided with cooling drums, the cold zone positioned immediately after the free loop, and a compartment for rolling provided with a cylindrical drum.

10. The device in accordance with claim 9, wherein the roller arranged upstream of the loop is at a higher level than that of the roller arranged downstream.

11. The device in accordance with claim 9, comprising a detector for marking the position of the lower level of the loop, the signal from which is transmitted to a means for regulating the speed of the cooling drums.

12. The device in accordance with claim 9, comprising heating means arranged upstream of the first roller supporting the free loop.

13. The device in accordance with claim 12, wherein the heating means comprise infrared resistance heaters.

* * * * *